US012560271B2

(12) United States Patent
Wan et al.

(10) Patent No.: US 12,560,271 B2
(45) Date of Patent: Feb. 24, 2026

(54) COATED PIPE SECTION AND METHOD FOR COATING A PIPE

(71) Applicant: 2543500 ALBERTA LTD B.D.A. SHAW PIPE PROTECTION, Calgary (CA)

(72) Inventors: Eileen Wan, Toronto (CA); Tor Fredrik Bredeli, Toronto (CA); Torgeir Sletvold, Toronto (CA); Jan Peder Hegdal, Toronto (CA); Suresh Choudhary, Toronto (CA); Per Ove Singstad, Toronto (CA); Guido Ridolfi, Toronto (CA)

(73) Assignee: 2543500 ALBERTA LTD B.D.A. SHAW PIPE PROTECTION., Calgary (CA)

( * ) Notice: Subject to any disclaimer, the term of this patent is extended or adjusted under 35 U.S.C. 154(b) by 47 days.

(21) Appl. No.: 17/622,116

(22) PCT Filed: Jun. 25, 2020

(86) PCT No.: PCT/CA2020/050880
§ 371 (c)(1),
(2) Date: Dec. 22, 2021

(87) PCT Pub. No.: WO2020/257931
PCT Pub. Date: Dec. 30, 2020

(65) Prior Publication Data
US 2022/0243858 A1    Aug. 4, 2022

Related U.S. Application Data

(60) Provisional application No. 62/866,387, filed on Jun. 25, 2019.

(51) Int. Cl.
*F16L 58/10* (2006.01)
*B29C 48/09* (2019.01)
(Continued)

(52) U.S. Cl.
CPC ............ *F16L 58/109* (2013.01); *B29C 48/09* (2019.02); *B29C 48/151* (2019.02); *F16L 9/147* (2013.01);
(Continued)

(58) Field of Classification Search
CPC ........ B05D 7/222; F16L 58/109; F16L 9/147; F16L 9/19; F16L 53/38; B29C 48/09; B29C 48/151; B29L 2023/225
See application file for complete search history.

(56) References Cited

U.S. PATENT DOCUMENTS

| | | |
|---|---|---|
| 6,940,054 B1 | 9/2005 | Heggdal et al. |
| 2009/0015914 A1 | 1/2009 | Duncan et al. |

(Continued)

FOREIGN PATENT DOCUMENTS

| | | |
|---|---|---|
| CN | 105042208 A | 11/2015 |

OTHER PUBLICATIONS

International Search Report dated Aug. 31, 2020 issued in PCT/CA2020/050880.

(Continued)

*Primary Examiner* — Hai Y Zhang
(74) *Attorney, Agent, or Firm* — HUNTON ANDREWS KURTH LLP

(57) ABSTRACT

Described is a method for manufacturing coated pipe sections having a hollow conduit or an electrical cable within the coating. Also described are such pipe sections. The hollow conduit may be used to place sensors, fiber optics, or heating cable within the coating.

10 Claims, 6 Drawing Sheets

(51) Int. Cl.
| | |
|---|---|
| *B29C 48/151* | (2019.01) |
| *F16L 9/147* | (2006.01) |
| *F16L 9/19* | (2006.01) |
| *F16L 53/38* | (2018.01) |
| *B29L 9/00* | (2006.01) |
| *B29L 23/00* | (2006.01) |

(52) U.S. Cl.
CPC .................. *F16L 9/19* (2013.01); *F16L 53/38* (2018.01); *B29L 2009/005* (2013.01); *B29L 2023/225* (2013.01)

(56) References Cited

U.S. PATENT DOCUMENTS

| | | | |
|---|---|---|---|
| 2009/0159146 A1 | 6/2009 | Jackson et al. | |
| 2015/0285409 A1* | 10/2015 | Espinasse | ............. F16L 59/025 |
| | | | 29/455.1 |

OTHER PUBLICATIONS

Energy Efficiency, HVAC Services, Hydronic Heating, How Your New Hydronic Heating System works, https://efficienttexas.com/new-hydronic-heating-system-works/. (Year: 2012).

Coulson et al., Analysis of modular composite heat pipes, 2018, Elsevier, International Journal of Heat and Mass Transfer 127 ( 2018) 1198-1207. (Year: 2018).

Office Action issued in corresponding Mexican Patent Application No. MX/a/2022/000010 on May 21, 2025 (machine translation).

Office Action issued in corresponding Brazilian Patent Application No. 11 2021 026110 9 on Aug. 7, 2025 (English translation).

* cited by examiner

COATED PIPE SECTION AND METHOD FOR COATING A PIPE

FIELD

The present disclosure is related to a coated pipe section, and a method for coating a pipe section, particularly for manufacturing a pipe section with one or more layers of coating.

BACKGROUND

An oil and gas pipeline is typically made from a plurality of steel pipe sections coupled end-to-end through what is often referred to as a "girth weld"—a weld around the perimeter of the steel pipe sections.

In addition, a pipeline is generally coated for impact and corrosion resistance, as well as for insulation and/or weight. There may be a plurality of coatings. For example, a metal pipe may be coated in a thin layer of epoxy, followed by a polyolefin layer (such as polyethylene or polypropylene). This may be followed by a layer of foam insulation and a topcoat layer of polyethylene, for example, or a layer of concrete. Often the polyolefin coating is quite thick. It would be desirable to introduce additional functionality into the thick coating. For example, it may be desirable to incorporate sensors, such as fiber optic cables, into the coating layer to detect various operating conditions, such as a possible leak, in the pipeline. Alternatively, it may be desirable to introduce heating cables into the thermal insulation layer to improve upon the thermal insulation of the pipeline to maintain the flow of the hydrocarbon carried therewithin.

Pipeline coating incorporating channels is known in the art. However, methods for accomplishing this still leaves much to be desired. For example, known methods for manufacturing channels within pipeline coating, as described in U.S. Pat. No. 6,328,074, incorporated herein by reference, typically include first forming the coating layers with at least one groove machined or formed therein. After positioning heating cable or fibre optic cables into the grooves, they are filled with another coating process. The multiple discrete manufacturing steps in the foregoing method are costly and time consuming and may compromise the long-term integrity of the pipeline coating.

Other examples of methods for applying a conduit to a pipe can be found in U.S. Pat. Nos. 6,528,004, 6,940,054, US patent publications 20070034274, 20080006337 and 20150053293, as well as PCT publication WO 2020/058769A1, all incorporated herein by reference.

There is a need for an improved method of manufacturing pipelines with hollow channels embedded within the coating layers and apparatus for accomplishing same. There is particular need for such methods for use with pipelines coated with wet thermal insulation, for use under water, where the insulation can withstand direct contact with sea water and underwater hydrostatic pressures.

There is also a need for an improved pipeline having an insulation coating capable of direct contact with seawater and underwater hydrostatic pressures, having hollow channels embedded within the coating, where the channels are shaped to maximize thermal transfer to the underlying pipe.

SUMMARY OF THE INVENTION

According to one aspect of the present invention is provided a method of coating a pipe section, the method comprising: displacing the pipe section longitudinally through a coating system; displacing at least one elongated member through the coating system concurrently with the pipe section; applying a coating layer of circumferential coating by the coating system to the pipe section, wherein the at least one elongated member is embedded within the coating layer of circumferential coating.

According to certain embodiments, wherein the coating layer is an anti-corrosion layer, a polyolefin layer or an insulation layer.

According to certain embodiments, the method further comprises applying at least one further layer prior to or overtop of the coating layer.

In certain embodiments, the coating layer is a polyolefin layer and the at least one further layer comprises an anti-corrosion layer applied prior to said coating layer.

In certain embodiments, the coating layer is a polyolefin layer and the at least one further layer comprises an insulation layer applied overtop of said coating layer.

In certain embodiments, the coating layer is an insulation layer and the at least one further layer comprises an anti-corrosion layer applied prior to said coating layer.

In certain embodiments, the coating layer is an insulation layer and the at least one further layer comprises a polyolefin layer applied prior to said coating layer.

In certain embodiments, the method further comprises applying a top coat layer overtop of the coating layer or insulation layer.

In certain embodiments, the anti-corrosion layer applied prior to said coating layer is of a variable thickness, having a thinner coating in the areas where the at least one elongated member is to be situated and a thicker coating in the areas where there is no elongated member to be situated.

In certain embodiments, the anti-corrosion layer applied prior to said coating layer is thermally conductive and electrically insulating.

In certain embodiments, the elongated member is a solid rod.

In certain embodiments, the method further comprises removing the at least one elongated member from the coating layer to form at least one channel therein.

In certain embodiments, the removing includes applying a force to displace the elongated member from the coating layer.

In certain embodiments, the elongated member has a continuous cross-section and at least one internal channel.

In certain embodiments, the elongated member is a tubular rod with an internal channel.

In certain embodiments, an additional elongated member with a continuous cross-section is also embedded between the elongated member and the underlying pipe or layer.

In certain embodiments, the additional elongated member is made from a material that is same or similar as that of the elongated member.

In certain embodiments, the additional elongated member is made from a material with high thermal conductivity.

In certain embodiments, the elongated member has a continuous cross-section with at least one internal channel.

In certain embodiments, the elongated member has a cross sectional shape which increases contact surface area between the elongated member and the underlying pipe or layers.

In certain embodiments, the elongated member is made from a material that is same or similar as that of the coating layer.

In certain embodiments, the elongated member is made from a polymer composite with preferentially increased thermal conductivity.

In certain embodiments, the elongated member is made from a polymer composite reinforced for improved mechanical strength.

In certain embodiments, the elongated member is made from a polymer composite with preferentially increased thermal conductivity and reinforced for improved mechanical strength.

In certain embodiments, the at least one internal channel of the elongated member is filled with pressurized gas as the elongated member is embedded into the coating layer.

In certain embodiments, the pressurized gas is continuously circulated.

In certain embodiments, the pressurized gas is cooled.

In certain embodiments, the elongated member is metallic.

In certain embodiments, the elongated member is an electrically conductive cable.

In certain embodiments, the coating system is or comprises a crosshead die.

In certain embodiments, the crosshead die is shaped to allow the passage of the elongated member.

In certain embodiments, the coating system is or comprises a side extruder.

In certain embodiments, displacing the pipe section through the coating system further includes rotating the pipe section.

In certain embodiments, the method further comprises positioning at least one of heating cables, fiber optic cables, or sensors within the channel.

In certain embodiments, the channel is parallel to the pipe section.

In certain embodiments, the channel is helical around the pipe section.

According to a further aspect of the present invention is provided a multi-layer coated steel pipe, comprising: an inner steel pipe; an outer layer of thermal insulation; at least one elongated member embedded within the thermal insulation, with continuous cross-section and optionally at least one internal channel.

According to certain embodiments, the continuous cross-section is shaped to increase surface contact area with the inner steel pipe.

In certain embodiments, the outer layer of thermal insulation is capable of withstanding more than 1 MPa of hydrostatic pressure.

In certain embodiments, the outer layer of thermal insulation is capable of withstanding more than 5 MPa of hydrostatic pressure.

In certain embodiments, the outer layer of thermal insulation is capable of withstanding more than 10 MPa of hydrostatic pressure.

In certain embodiments, the outer layer of thermal insulation is capable of withstanding more than 30 MPa of hydrostatic pressure.

In certain embodiments, the multi-layer coated steel pipe further comprises at least one further layer under or overtop of the layer of thermal insulation.

In certain embodiments, the at least one further layer comprises an anti-corrosion layer under the layer of thermal insulation.

In certain embodiments, the at least one further layer further comprises one or more layers of additional thermal insulation.

In certain embodiments, the multi-layer coated steel pipe further comprises an outer top coat layer.

In certain embodiments, the anti-corrosion layer is preferentially thinned in the areas between the elongated member and inner steel pipe.

In certain embodiments, the anti-corrosion layer consists or partially consists of a material which is preferentially thermally conductive and electrically insulating.

In certain embodiments, the elongated member is made from a material that is same or similar as the thermal insulation.

In certain embodiments, the elongated member is made from a polymer composite with preferentially increased thermal conductivity.

In certain embodiments, the elongated member is made from a polymer composite reinforced for improved mechanical strength.

In certain embodiments, the elongated member is metallic.

In certain embodiments, the elongated member is an electrically conductive cable.

According to a further aspect of the present invention is provided a multi-layer coated steel pipe, comprising: an inner steel pipe; an outer layer of thermal insulation; at least one elongated member embedded within the thermal insulation, with continuous cross-section and optionally at least one internal channel; an additional elongated member with continuous cross-section located between each of the at least one elongated members and the inner steel pipe.

In certain embodiments, the outer layer of thermal insulation is capable of withstanding hydrostatic pressure of at least 1 MPa, for example, more than 5 MPa, more than 10 MPa, or more than 30 MPa.

According to certain embodiments, the multi-layer coated steel pipe further comprises at least one further layer under or on top of the layer of thermal insulation.

According to certain embodiments, the at least one further layer comprises an anti-corrosion layer under the layer of thermal insulation.

According to certain embodiments, the at least one further layer comprises further comprises one or more layers of additional thermal insulation layers.

According to further embodiments, the multi-layer coated steel pipe further comprises an outer top coat layer.

According to certain embodiments, the anti-corrosion layer is preferentially thinned in the areas between the elongated member and inner steel pipe.

According to certain embodiments, the anti-corrosion layer consists or partially consists of a material which is preferentially thermally conductive and electrically insulating.

According to certain embodiments, the at least one elongated member is made from a material that is same or similar as the thermal insulation.

According to certain embodiments, the at least one elongated member is made from a polymer composite with preferentially increased thermal conductivity.

According to certain embodiments, the at least one elongated member is made from a polymer composite reinforced for improved mechanical strength.

According to certain embodiments, the at least one elongated member is made from a polymer composite with preferentially increased thermal conductivity and reinforced for improved mechanical strength.

According to certain embodiments, the at least one elongated member is metallic.

According to certain embodiments, the at least one elongated member is an electrically conductive cable.

According to certain embodiments, the additional elongated member is made of the same or similar material to the at least one elongated member.

According to certain embodiments, the additional elongated member is of a higher thermal conductivity than the at least one elongated member.

According to one aspect of the present invention, there is provided a method of coating a pipe section, the method comprising: displacing the pipe section longitudinally through a coating system; displacing at least one elongated member through the coating system concurrently with the pipe section; applying a plurality of coating layers of circumferential coating by the coating system to the pipe section, wherein the at least one elongated member is fully or partially embedded within one of the plurality of layers of circumferential coating.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Through the description of various exemplary embodiments, the present disclosure describes a method and an apparatus for coating a pipe section which provides one or more enclosed hollow channels within the coating layers. The channel(s) may be used for receiving heating cables and/or fibre optic cable sensors. The present method and apparatus permit the enclosed channel(s) to be introduced into the coating layers while the coating layers are being deposited. The method may also be used to coat a pipe section with integrated electrical cables within the coating layer. The present disclosure may avoid multiple discrete steps in forming enclosed channels within pipeline coating layers, thereby reducing manufacturing time and cost. Also disclosed is a pipe section having hollow channels, or electrical cables, integrated within the coating.

Figure 1:
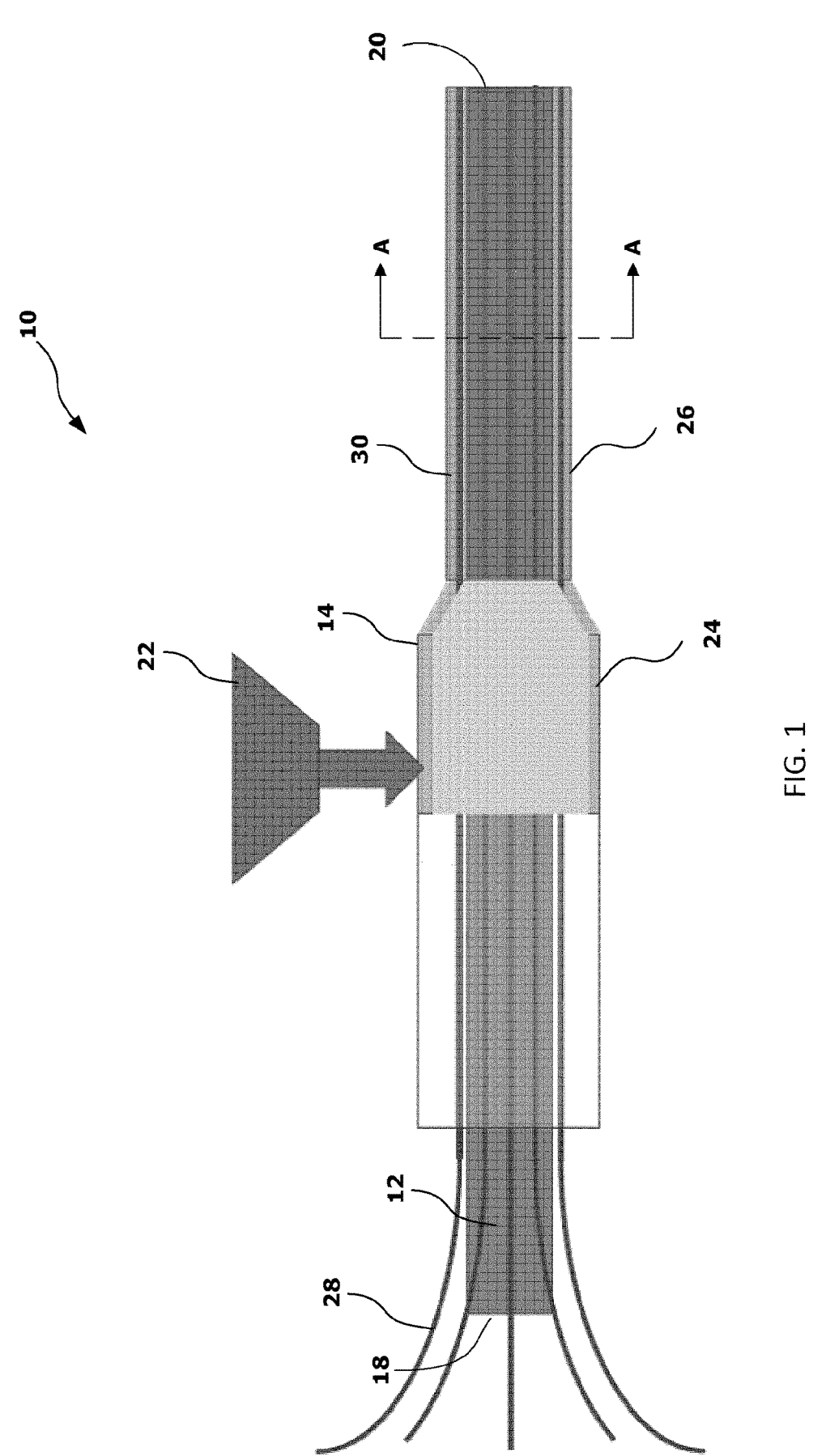
FIG. 1 is a schematic view of a pipe section displaced through a coating system in accordance with one exemplary method of the present disclosure.

FIG. 1 shows a method 10 for coating a pipe section 12 in accordance with one exemplary embodiment of the present disclosure.

In the illustrated embodiment, the pipe section 12 is displaced through a coating system, such as a die 14.

The pipe section 12 may comprise of one or more of pipes (not shown) assembled end-to-end to define a continuous central passage 16 configured for transporting a hydrocarbon material, such as natural gas or petroleum, from a first end 18 of the pipeline to a second end 20. Each of the plurality of pipes may be made from any suitable solid material, such as steel, stainless steel, or any other metal alloy. More than one pipe sections may be connected by welding or any other methods known in the art. Each pipe section may be of any suitable length, such as 50 feet. One or more of the pipe sections 12 may be assembled to form a pipeline that is kilometers in length.

In the illustrated exemplary embodiment, the die coating system 14 is a crosshead die coating system. The coating system 14 includes a melt inlet 22 through which the coating material is fed into annulus 24. The coating material may be a polyolefin, for example, polyethylene, or propylene; or any suitable material known in the art. The coating material is heated and melted within the coating system and extruded onto the pipe section 12 resulting in coated pipe section 26.

One or more elongated members 28, extending at least from the first end 18 to the second end 20 of the pipe section 12, are displaced through the annulus 24 of the coating system 14 concurrently with the pipe section 12. As may be appreciated by those skilled in the art, the number of elongated members 28 may vary as needed. The elongated members may be positioned circumferentially around the pipe section 12 in evenly spaced fashion or congregated within one or several areas as required.

Although the elongated members 28 are shown to be straight and positioned parallel to the pipe section 12, it is to be appreciated that the elongated members 28 may be of any suitable shape. For example, in some embodiments, the elongated member 28 may be helically shaped so that they may be spirally positioned around the pipe section 12. The elongated member 28 may also be sinusoidal, zig-zag, or another shape as needed.

In addition to having a circular cross section as shown, the elongated members 28 may be of any other suitable cross sectional shape, including but not limited to rectangular, square, oval, triangular, or irregular shapes, for example, a "saddle" shape which "hugs" the circumference of the pipe or coating. The cross sectional area of the elongated member 28 defines the dimensions of the channel to be formed in the coating layers.

During extrusion of the coating material within annulus 24 of the coating system 14, one or more elongated members 28 are covered with the coating material so as to be embedded within the coating 30 formed therefrom. It is to be appreciated that the coating system 14 may be a multi-layer coating system that applies a plurality of coating layers onto the pipe section 12, and accordingly, coating 30 may comprise a plurality of coating layers. As shown in the exemplary embodiment in FIG. 2, the plurality of layers may include an anticorrosion layer 29 immediately covering the steel pipe 12, for providing water-proof protection, for example, a layer of fusion bonded epoxy. The anticorrosion layer 29 may be covered with a polyolefin layer (not shown), an insulation layer 32, and/or an exterior protective (topcoat) layer 34.

Figure 2:
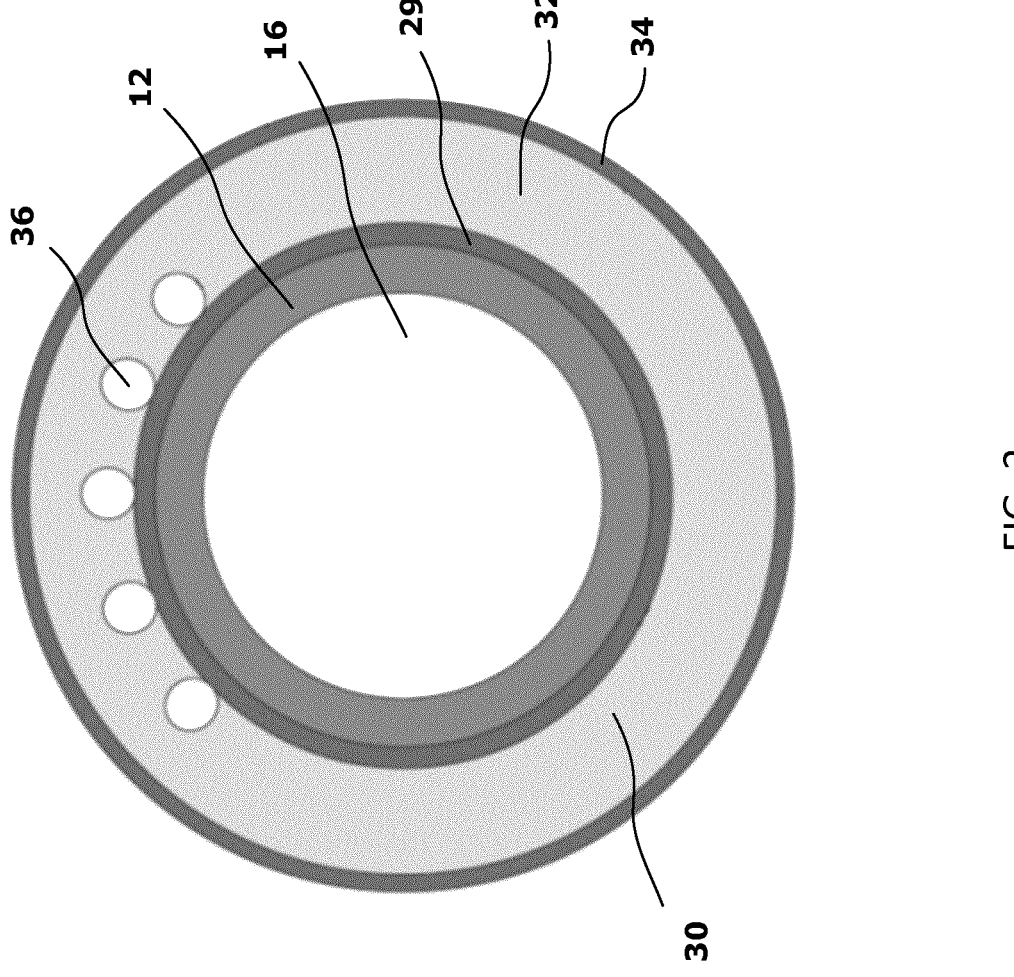
FIG. 2 is a cross sectional view of the coating pipe section along the A-A direction in FIG. 1.

Although the elongated members 28 are shown to be embedded into the thermal insulation layer 32 in FIG. 2, it is to be appreciated that the elongated members 28 may be embedded within any one of, or multiple layers of, the plurality of coating layers.

Figure 3:
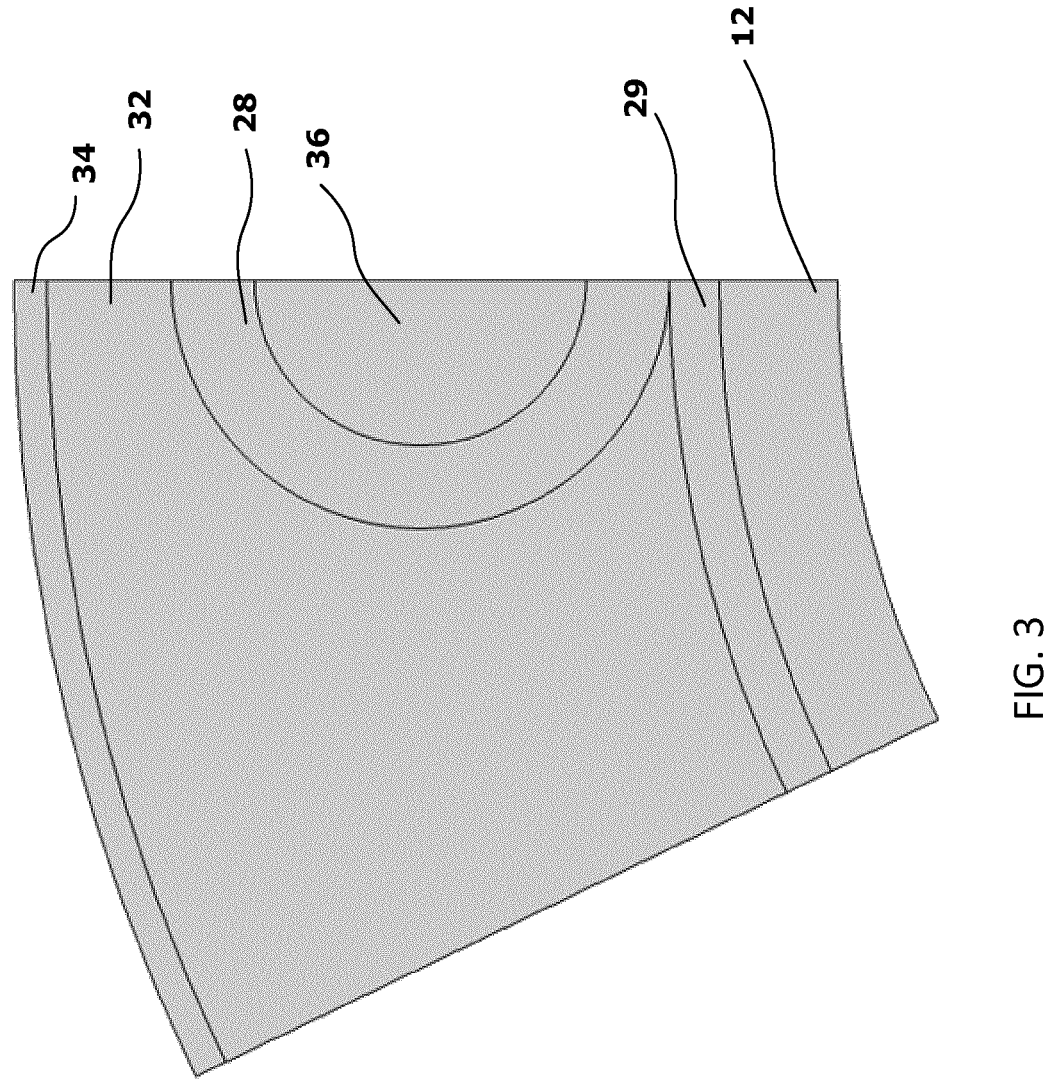
FIG. 3 is a close-up cutaway view of FIG. 2.
Figure 4:
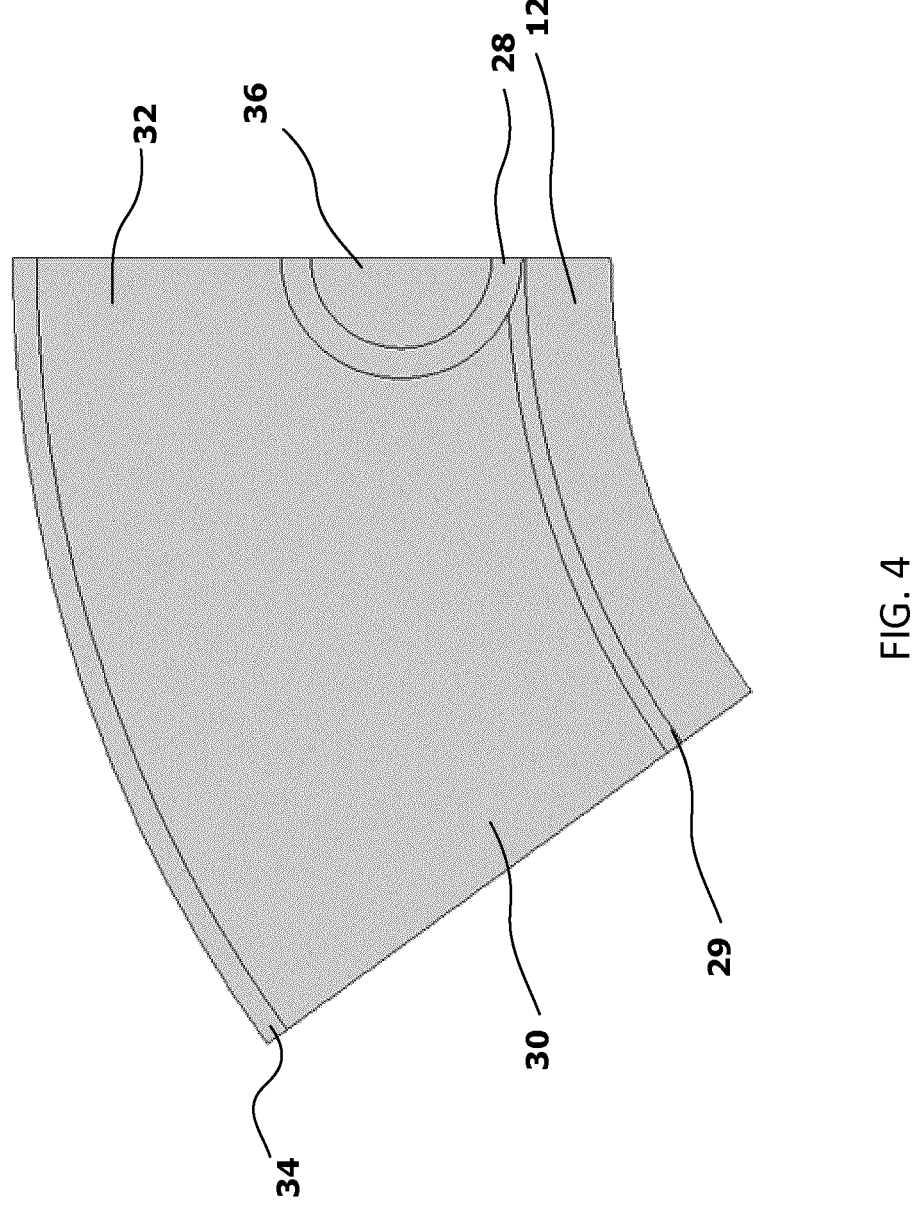
FIG. 4 is a view similar to FIG. 3 but showing an alternate configuration of the invention.

The position of the elongated members 28 within the layer in which they are embedded may vary as needed by adjusting configurations of the coating system as disclosed in more detail below. In the embodiment shown in FIG. 2, the elongated members 28, and in turn, the channels formed therefrom, are positioned in close proximity to the pipe section 12. Such configuration may be preferred for heating purposes as the channels created by the elongated members are closer to the pipe section 12. This may permit better thermal diffusion, and thereby allow more effective heating of the pipe section 12, so as to be able to prevent the hydrocarbon material transported within the pipes from solidifying in low temperatures. FIG. 3 shows a close-up cutaway view of FIG. 2, showing that the elongated members 28 are abutting the anticorrosion coating 29. In FIG. 3, the elongated member 28 is shown to be located within insulation layer 32, abutting the anticorrosion layer 29. FIG. 4 shows an alternate configuration, wherein elongated member 28 is configured to be within the anticorrosion layer 29. This can be done by making the anticorrosion layer 29 thinner in the circumferential locations where an elongated member 28 is to be placed, or alternatively, by placing the elongated member 28 onto the pipe while the anticorrosion layer 29 is still soft and has not yet cured.

In some embodiments, the thickness of the thermal insulation layer may be reduced due to the ability to embed heating elements within the thermal insulation layer. Hence, the overall thickness of the coating layers is reduced. Further, in certain embodiments, the anticorrosion layer, which may be thermally conductive and/or electrically insulating, may be applied in variable thickness, corresponding to whether an elongated member 28 will be placed overtop of it. For example, the anticorrosion layer may be applied in a manner such that it is thinner in the areas where the elongated members are to be situated, and thicker in the areas where there will be no elongated member overtop. This may help, for example, in the transfer of heat from the channels to the steel pipe.

Figure 5:
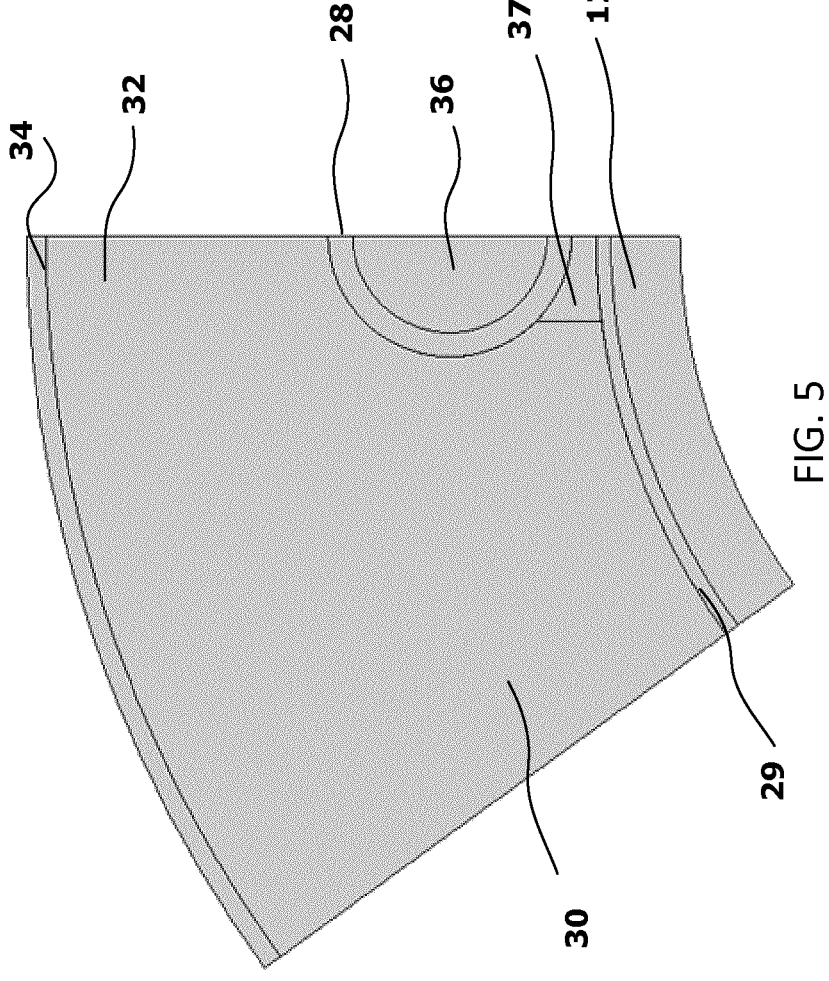
FIG. 5 is a view similar to FIG. 3 but showing an alternate configuration of the invention.
Figure 6:
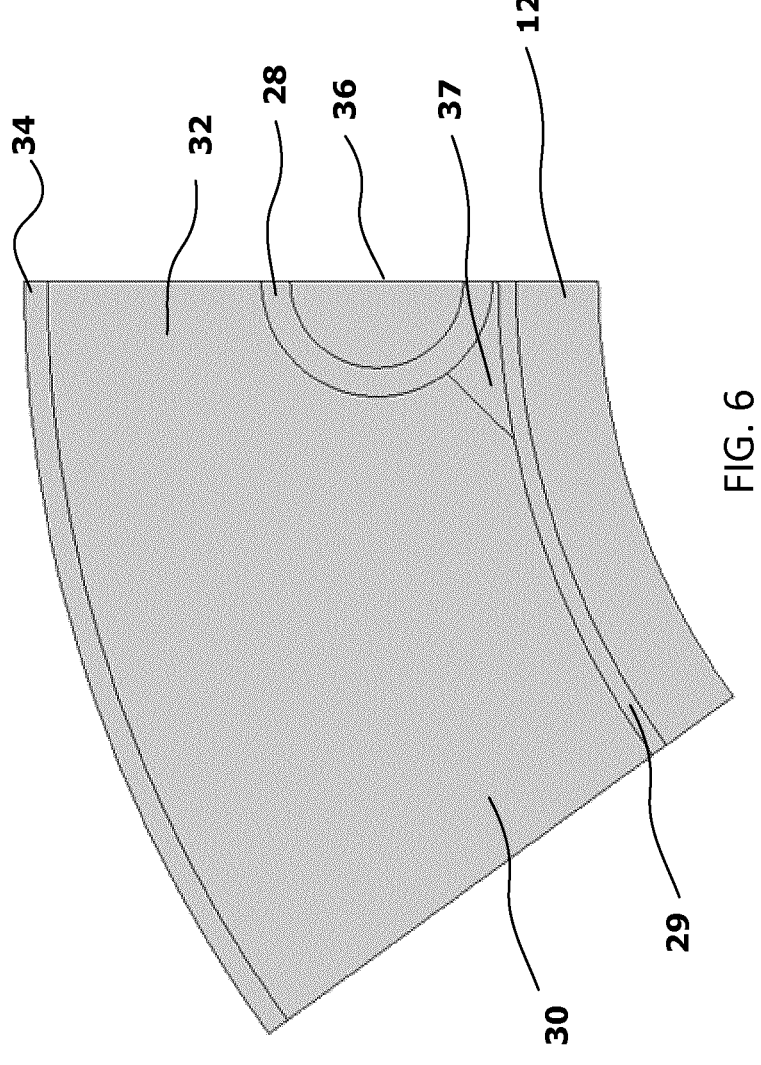
FIG. 6 is a view similar to FIG. 3 but showing an alternate configuration of the invention.

Also to help with heat transfer, a "saddle" configuration may be used, as shown in FIGS. 5 and 6. Saddle 37 may be made of the same material as the elongated member 28, or it may be of a highly heat conductive material, such as, for example, aluminum. Saddle 37 may be integrated with the elongated member, or a separate piece.

In some embodiments, the elongated members 28 may be made of solid metal rods. Upon cooling of the coating material upon pipe section 12. The metal rods may be removed from the coating layers by exerting sufficient force from one end. Removal of the metal rods results in a corresponding number of channels 36 within the coating layers. The channels 36 may be configured to receive heating elements, fibre optical sensors, or any other suitable equipment. The rod may preferably be made of smoothed metal with low coefficient of friction with the coating material, or coated to create a low coefficient of friction with the coating material, thereby facilitating easier removal. It is to be appreciated that any other method of removing the elongated member 28 from the coating material may be used.

In some embodiments where heating elements are inserted into the channel 36, the temperature of the heating elements should be configured to be below the softening point of the material from which the thermal insulation layer 36 is made. By way of an example, for styrenic foam the temperature should not exceed 80 degrees Celsius with a preferred average temperature of 60 degrees Celsius. For polypropylene foam, the maximum temperature should not exceed 120 degrees Celsius with a preferred average temperature of approximately 90 degrees Celsius. For solid polypropylene or styrenic material, the maximum allowable temperature raises to approximately 150 and 95 degrees Celsius, respectively. In some embodiments, the foam material used in one or more of the coating layers may be specifically designed taking into account the interactions between the heating elements and the coating system.

In some embodiments, the elongated members 28 may be made of an electrically conductive cable.

In some embodiments, the elongated members 28 may be made of hollow rods (such as a tubular shaped rod), each with an internal channel. In some embodiments, the hollow rods may be used in a similar fashion as the solid rods as discussed above. In some other embodiments, upon formation of the coating layers, the hollow rods are not removed and left within the one or more of the coating layers. The internal channel may be circular, or it may have a different cross-sectional shape which increases contact surface area between the elongated member and the underlying pipe or layers. The internal channel may be circular and the external cross-section may be a different cross-sectional shape which increases contact surface area between the elongated member and the underlying pipe or layers. For example, the bottom of the cross-section of the elongated member may be shaped to conform generally to a portion of the circumference of the pipe it is to be placed proximal to—a shape referred to as a "saddle".

In some embodiments, multiple rods may be used, one overtop of another (for example), or at different relative "depth" within the coating layer. This may be useful, for example, where the elongated members create channels and the channels are used for different purposes—for example, for heating cable nearer to the steel of the pipe conduit, and fiber optic cable further from the steel of the pipe conduit.

In some preferred embodiments, the tubular rods may be manufactured from the same material as that of the layer in which they are to be embedded. Thus, the coating layer and the tubular rods may be well bonded. The surface of the tubular rods may pre-heated by an appropriate means before introduction into the coating layer to facilitate bonding to the coating layer.

In some embodiments, the elongated member may be made from a polymer composite with higher thermal conductivity than the coating layer in which it is embedded. The polymer composite may be reinforced, for improved mechanical strength.

In the cases where the elongated member has an internal channel, where the elongated member is made from the same or similar material as that of the layer in which they are to be embedded, it has been found that filling the internal channel of the elongated member with a pressurized gas while the elongated member is being embedded improves performance and reduces the probability of the internal channel collapsing during installation. The pressurized gas may be continuously circulated in the internal channel, and may be cooled to further aid with elongated member integrity during the coating process.

When the pipe section 12 and the elongated members 28 are displaced through the coating system 14, the pipe section and the elongated members 28 may be kept non-rotational. Alternatively, at least one of the pipe section 12 and the elongated members 28 may be rotated while being displaced through the coating system 14.

As may be appreciated from the above, the present disclosure discloses methods of coating a pipe section where only one pass through the coating system may be required, although in certain embodiments, multiple passes may be used to build up total coating thickness. Further, the coating layers do not need to be cut to form grooves nor require any infill process. The foregoing may allow for a pipe coating process that is time efficient and cost effective.

In some embodiments, the coating system 14 comprises a modified crosshead die 40. In other embodiments, the coating system comprises a different polyolefin application method, for example, a side-extruder. In the case of a crosshead die, the die may be configured to allow the passage of the elongated member through the cross-head die.

Example 1: Pipe and Method of Manufacture

A steel pipe, pre-coated with a 3-layer polystyrene anticorrosion coating (consisting of a fusion bonded epoxy layer most proximal to the steel of the pipe, followed by a polystyrene adhesive, followed by a polystyrene topcoat) is conveyed in a straight line, where the polystyrene anticorrosion coating is pre-heated before passing through a crosshead die. Three lines of polypropylene tubing are fed from reels, through the crosshead die, at the same time and at the same speed as the 3-layer polystyrene coated pipe and are aligned in place spaced equidistant around the 3-layer polystyrene coated pipe and parallel to the pipe, just before entering the crosshead die. In this manner, the three lines of polypropylene tubing pass through the die at the same time as the pipe, proximal to the pipe, and are coated simultaneously as the pipe as it passes through the die. Chilled circulated air is fed within the polypropylene tubing, to keep the channel open.

As the pipe (and polypropylene tubing) pass through the die, the die applies a polystyrene foam insulation material to surround both the pipe and the polypropylene tubing. Optionally, the crosshead die also co-extrudes an outer polystyrene topcoat.

The polystyrene foam insulation, and the outer polystyrene topcoat are allowed to cool and the pipe length tested for resistance to hydrostatic pressure. The pipe length is found to withstand at least 1500 metres of water depth at a system maximum operating temperature of 100 degrees C., with the polypropylene tubing providing channels within the polystyrene foam insulation which do not collapse under such pressure.

Example 2: Pipe and Method of Manufacture

A steel pipe, pre-coated with a 3-layer polystyrene anticorrosion coating (consisting of a fusion bonded epoxy layer most proximal to the steel of the pipe, followed by a polystyrene adhesive, followed by a polystyrene topcoat) is conveyed in a straight line, where the polystyrene anticorrosion coating is pre-heated before passing through a crosshead die. Three lines of hollow tubular steel tubing are fed from reels, through the crosshead die, at the same time and at the same speed as the 3-layer polystyrene coated pipe and are aligned in place spaced equidistant around the 3-layer polystyrene coated pipe and parallel to the pipe, just before entering the crosshead die. At the same time, three lines of aluminum "saddle" are fed, one between each of the steel tubing and the pipe. The saddles are solid pieces of aluminum, thin and flexible enough to be reel-fed, and having a configuration such that the "top" of the saddle, most proximate to the steel tubing, generally conforms to the tubing, and the "bottom" of the saddle, most proximate to the pipe, conforms to the pipe. The three lines of polypropylene tubing, and the three saddles, pass through the die at the same time as the pipe, proximal to the pipe, and are coated simultaneously as the pipe as it passes through the die.

As the pipe, saddles, and tubing pass through the die, the die applies a polystyrene foam insulation material to surround the pipe, saddles and tubing. Optionally, the crosshead die also co-extrudes an outer polystyrene topcoat.

The polystyrene foam insulation, and the outer polystyrene topcoat are allowed to cool and the pipe length tested for resistance to hydrostatic pressure. The pipe length is found to withstand at least 1500 metres of water depth at a system maximum operating temperature of 100 degrees C., with the steel tubing providing channels within the polystyrene foam insulation which do not collapse under such pressure.

The invention claimed is:

1. A method of coating a pipe section, the method comprising:
    displacing the pipe section longitudinally through a coating system;
    displacing at least one elongated member through the coating system concurrently with the pipe section; and then
    embedding the at least one elongated member by applying a coating layer of circumferential coating by the coating system to the pipe section, wherein the elongated member has a continuous cross-section and at least one internal channel, wherein the at least one internal channel of the elongated member is filled with pressurized gas as the elongated member is embedded into the coating layer.

2. The method of claim 1 further comprising applying at least one further layer prior to or overtop of the coating layer.

3. The method of claim 2 wherein the coating layer is a polyolefin layer or an insulation layer, and the at least one further layer comprises an anti-corrosion layer applied prior to said coating layer.

4. The method of claim 3 wherein the anti-corrosion layer applied prior to said coating layer is of a variable thickness, having a thinner coating in the areas where the at least one elongated member is to be situated and a thicker coating in the areas where there is no elongated member to be situated.

5. The method of claim 1 further comprising:
    removing the at least one elongated member from the coating layer to form at least one channel therein.

6. The method of claim 5, wherein the removing includes applying a force to displace the elongated member from the coating layer.

7. The method of claim 1, where an additional elongated member with a continuous cross-section is also embedded between the elongated member and the underlying pipe or layer, said additional elongated member having a cross sectional shape which increases contact surface area between the elongated member and the underlying pipe or layers.

8. The method of claim 1, wherein the pressurized gas is continuously circulated.

9. The method of claim 1, wherein the pressurized gas is cooled.

10. The method of claim 1 further comprising:
    positioning at least one of heating cables, fiber optic cables, or sensors within the channel.

* * * * *